United States Patent [19]
Nakama et al.

[11] Patent Number: 5,514,771
[45] Date of Patent: May 7, 1996

[54] PROCESS FOR PREPARATION OF SOLUBLE ION-DOPED POLY (ALKYL-SUBSTITUTED PYRROLE)

[75] Inventors: Katsumi Nakama; Hiroyuki Sato, both of Shizuoka, Japan

[73] Assignee: Toho Rayon Co., Ltd., Tokyo, Japan

[21] Appl. No.: 373,403

[22] Filed: Jan. 17, 1996

[30] Foreign Application Priority Data

Jan. 19, 1994 [JP] Japan .................................. 6-017727

[51] Int. Cl.$^6$ .......................... C08G 73/06; H01B 1/06
[52] U.S. Cl. ...................... 528/423; 252/518; 252/519
[58] Field of Search ........................... 528/423; 252/500, 252/518, 519

[56] References Cited

U.S. PATENT DOCUMENTS

| | | | |
|---|---|---|---|
| 4,697,001 | 9/1987 | Walker et al. | 528/423 |
| 4,710,401 | 12/1987 | Warren et al. | 528/423 |
| 5,407,699 | 4/1995 | Myers | 528/423 |

OTHER PUBLICATIONS

"The Polyanilines: Potential Technology Based on New Chemistry and New Properties", A. G. MacDiarmid et al. Proceedings, European Physical Society Industrial Workshop Science and Applications of Conducting Polymers, May 1990, Norway.

*Primary Examiner*—Tae Yoon
*Attorney, Agent, or Firm*—Sughrue, Mion, Zinn, Macpeak & Seas

[57] ABSTRACT

A process for the preparation of an organic solvent soluble ion-doped poly(alkyl-substituted pyrrole) which comprises dissolving an alkyl-substituted pyrrole compound represented by formula (I) in an organic solvent, oxidation-polymerizing the dissolved alkyl-substituted pyrrole in the presence of at least one oxidation polymerization agent selected from the group consisting of a ferric salt and a copper (II) salt to form an ion-doped poly(alkyl-substituted pyrrole), next adding water to the polymerization reaction system thus obtained and then recovering an organic solvent soluble ion-doped poly(alkyl-substituted pyrrole):

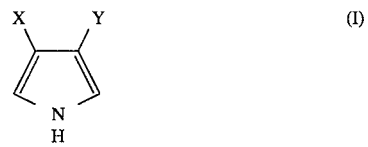

(I)

wherein X represents an alkyl group; and Y represents a hydrogen atom or an alkyl group.

18 Claims, No Drawings

PROCESS FOR PREPARATION OF SOLUBLE ION-DOPED POLY (ALKYL-SUBSTITUTED PYRROLE)

FIELD OF THE INVENTION

The present invention relates to a process for the preparation of an ion-doped poly(alkyl-substituted pyrrole) that is soluble in an organic solvent such as tetrahydrofuran (THF), benzene, toluene and chloroform.

More particularly, the present invention relates to a process for the preparation of an ion-doped poly(alkyl-substituted pyrrole) having no components or a low content of components insoluble in THF.

BACKGROUND OF THE INVENTION

It is known that polymers having conjugated double bonds such as polyacetylene, polypyrrole, polythiophene and polyaniline become electrically conductive when doped with ions. It has been a common practice to utilize such electrically conductive polymers as an electrode active substance for a secondary battery, a solid electrolyte for an electrolytic capacitor, an antistatic agent, etc.

Among these electrically conductive polymers, polypyrrole exhibits a relatively high stability of electric conductivity in the air and thus has been practically used as a solid electrolyte for an electrolytic aluminum capacitor or an active positive electrode substance for a secondary battery.

However, an electrically conductive polymer is disadvantageous in that it is normally infusible and insoluble in a solvent and thus has a limited moldability. Consequently, it is difficult to obtain a product having a desired shape. Thus, in the present state of the art a polymer is deposited on the surface of an electrode by electrolytic polymerization. The polymer is then peeled off the electrode to obtain a film which is used as is. Alternatively, a powdered polymer obtained by chemical oxidation-polymerization is used.

Furthermore, JP-A-63-101415 (corresponding to U.S. Pat. Nos. 4,697,001 and 4,710,401; the term "JP-A" as used herein means an "unexamined published Japanese patent application") discloses a process for preparing an electrically conductive polymer from 3-alkyl or 3,4-dialkyl-substituted pyrrole, which comprises oxidation-polymerizing 3-alkyl or 3,4-dialkyl-substituted pyrrole in a solvent to obtain a precipitate, separating the precipitate, and then drying the precipitate to prepare an electrically conductive polymer or which comprises contacting liquid 3-alkyl or 3,4-dialkyl-substituted pyrrole with a porous substrate, and then oxidation-polymerizing the liquid 3-alkyl or 3,4-dialkyl-substituted pyrrole impregnated into the substrate to polypyrrole, to thereby prepare a composite of an electrically conductive polypyrrole.

The present inventors found that by the chemical oxidation polymerization of 3-alkyl or 3,4-dialkyl-substituted pyrrole (hereinafter referred to as "alkyl-substituted pyrrole") in an organic solvent such as alcohol in the presence of a oxidation-polymerization agent an ion-doped polymer is obtained which exhibits little or no solubility in most ordinary organic solvents. Therefore, an ion-doped polypyrrole obtained by a process which comprises subjecting an alkyl-substituted pyrrole to polymerization reaction in a solvent to obtain a precipitate which precipitate is then separated from the reaction system, cannot be dissolved in most ordinary organic solvents. Consequently, this material cannot be molded using a solvent. In order to obtain a molded product of an ion-doped polypyrrole, a method can be employed which comprises compression-molding a powdered ion-doped polypyrrole produced by a polymerization reaction. However, the ion-doped polypyrrole cannot be molded using solvent and thus has limited moldability.

SUMMARY OF THE INVENTION

An object of the present invention is to solve the above described problems of the prior art and to provide a process for preparing poly(alkyl-substituted pyrrole) having improved solubility by chemical oxidation-polymerization of an alkyl-substituted pyrrole.

A second object of the present invention is to provide an ion-doped poly(alkyl-substituted pyrrole) having improved solubility in an organic solvent, and having high electroconductivity.

The above objects are achieved by a process for preparing an ion-doped poly(alkyl-substituted pyrrole) comprising dissolving an alkyl-substituted pyrrole compound represented by formula (I) in an organic solvent, oxidation-polymerizing the alkyl substituted pyrrole in the presence of at least one oxidation-polymerization agent selected from the group consisting of a ferric salt, a copper (II) salt, and said salts having water of crystallization to form an ion-doped poly-(alkyl-substituted pyrrole), next adding water to the polymerization reaction system thus obtained and then recovering an organic solvent soluble ion-doped poly(alkyl-substituted pyrrole):

wherein X represents an alkyl group; and Y represents a hydrogen atom or an alkyl group.

DETAILED DESCRIPTION OF THE INVENTION

It is considered that a dialkyl-substituted pyrrole releases hydrogen atoms at the 2- and 5-positions to form a polymer having the following monomer unit.

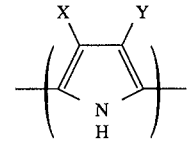

When monoalkyl-substituted pyrrole is used as a monomer, the 4-position can also release a hydrogen atom to form an active position for polymerization which causes a cross linking reaction.

The polymer contains counter ions derived from the oxidation-polymerization agent generally in an amount of from 0.1 to 0.4, preferably from 0.2 to 0.35 per monomer unit.

The ion-doped poly(alkyl-substituted pyrrole) obtained according to the process of the present invention is an electrically conductive polymer that is soluble in many organic solvents having a solubility parameter (defined as $\delta=(\Delta H/V)^{1/2}$ where $\Delta H$ is the molar heat of vaporization of liquid, and V is the molar volume of liquid (unit: $\text{cal/cm}^3)^{1/2}$; *POLYMER HANDBOOK*, (3rd Ed;, John Wiley & Sons (U.S.A.)) of 7 to 10 such as tetrahydrofuran (THF), benzene, toluene, and chloroform. Consequently, the polymer of the present invention exhibits excellent moldability using such solvents. According to the present invention, a poly(alkyl-substituted pyrrole) organic solvent solution having a polymer concentration of 5% or higher (at 23° C.) can be obtained.

Thus, the polymer can be used for production of a solid electrolyte for an electrolytic capacitor, an electrode active substance for a secondary battery, an antistatic agent, etc.

The synthesis of 3-alkylpyrrole or 3,4-dialkylpyrrole represented by formula (I) can be accomplished by known methods. For example, a synthesis method can be employed which comprises introducing a large substituent (e.g., tosyl, trimethylsilyltrifluoromethanesulfonate) at the N-position of pyrrole to obtain a starting material, subjecting the substituted pyrrole to Friedel-Crafts reaction to acylate the $\beta$-position thereof, eliminating the substituent from the N-position of the pyrrole, and then reducing the acyl group to the desired alkyl group. Such a method is described for example, JP-A-2-11621.

Preparation of 3-alkylpyrrole can be also accomplished by the process described in JP-A-6-271536, i.e., a method which comprises chemically reducing 3-alkanoyl-1-arylsulfonylpyrrole with a metal hydride in an organic solvent.

Examples of the metal hydride include sodium bismethoxy aluminum hydride, sodium aluminum hydride, lithium aluminum hydride, and trialkoxy derivatives thereof.

The number of carbon atoms in the alkyl group of formula (1) is selected depending on the solubility or electric conductivity of the polymer thus obtained. In general, the number of carbon atoms in the alkyl group of the monoalkyl-substituted pyrrole is from 3 to 20, preferably from 6 to 18. In the dialkyl-substituted pyrrole, one of the two alkyl groups preferably has from 6 to 18 carbon atoms, and the other preferably has from 1 to 12 carbon atoms.

Examples of a preferred alkyl group of a monoalkyl-substituted pyrrole include an alkyl group having 6, 8, 9, 10, 12, or 18 carbon atoms, more preferably 8, 9, 10 or 12 carbon atoms, and examples of a preferred combination of two alkyl groups in a dialkyl-substituted pyrrole include an alkyl group having from 2 to 12 carbon atoms (preferably 2, 4, 6, 8, 9 or 12 carbon atoms) and an alkyl group having from 8 to 18 carbon atoms (preferably 8, 9, 12 or 18 carbon atoms). Examples of a combination of the numbers of carbon atoms in a dialkyl-substituted pyrrole is 2 and 8, 2 and 9, 2 and 10 2 and 12, 4 and 8, 4 and 9, 4 and 10, and 4 and 12.

The alkyl-substituted pyrrole represented by the foregoing formula (I) may be used singly or in combination thereof.

Solvents for use in the polymerization reaction of an alkyl-substituted pyrrole in the present invention include an organic solvent which dissolves the monomer and does not inhibit the oxidation reaction. Examples thereof include an aliphatic alcohol such as methanol and ethanol, tetrahydrofuran, acetonitrile, benzene, toluene, acetone, diethyl ether, and mixtures thereof. In particular, alcohols are advantageously used to obtain a polymer having a high electrical conductivity.

An organic solvent containing absorbed water due to its hygroscopicity under actual working conditions may be used in the present invention. However, it is undesirable to intentionally add water to an organic solvent for use in dissolving the monomer therein. The reason is that if water is added to an organic solvent used for dissolving the monomer therein, the poly(alkyl-substituted pyrrole) produced according to the present invention has poor solubility in the organic solvent. The water content of the organic solvent is preferably less than 1% by weight.

The ferric salt and copper (II) salt for use in the present invention are compounds comprising a ferric ion or copper (II) ion which serves as an oxidizing agent in the chemical oxidation polymerization and a counter ion which serves as a dopant for the polymer. Examples of the ferric salt include commercially available ferric salts (including those having water of crystallization) such as ferric chloride, ferric chlorate, and ferric sulfate, and aromatic ferric sulfonates. Examples of the aromatic ferric sulfonates include ferric benzenesulfonate, ferric alkylbenzenesulfonate, and ferric naphthalenesulfonate, ferric alkylnaphthalenesulfonate. These aromatic ferric sulfonates can be synthesized by the method described in JP-A-63-101415 corresponding to U.S. Pat. Nos. 4,697,001 and 4,710,401. Examples of the copper (II) salt (including those having water crystallization) include copper (II) chlorate and copper (II) benzenesulfonate.

The oxidation-polymerization agent is preferably completely dissolved in the solvent used for the polymerizaiton reaction. However, a part of the agent may be present in an undissolved and dispersed state.

The ratio of the various starting materials charged in the preparation process of the present invention depends on the polymer monomer, oxidation-polymerization agent and solvent that are selected. For example, the charge ratios may be selected depending on the solubility of the starting materials. In general, the charge amount of the monomer is preferably in the range of from 0.01 to 5 mols per 1 more preferably 0.1 to 4.5 mols per 1 of the organic solvent. The molar ratio of the oxidation polymerization agent to monomer is preferably in the range of from 0.1/1 to 5/1, more preferably from 1.5/1 to 2.5/1. When the ratio is reduced to less than 0.1/1 the yield of the polymer tends to be insufficient. On the other hand, when the ratio is increased to larger than 5/1, the solubility of the polymer tends to decrease.

The ion-doped poly(alkyl-substituted pyrrole) of the present invention can be prepared by a process which comprises adding an oxidation polymerization agent to a solution of a monomer in an organic solvent with stirring, and then allowing the components of the reaction solution to react. The reaction is preferably conducted under an inert atmosphere, for example, in a nitrogen gas atmosphere. The reaction temperature may be within the range of from –30° C. up to the boiling point of the solvent, however, it is usually within the range of from –30° C. to 30° C., preferably from –20° C. to 10° C. The reaction time is usually at least 3 minutes and is preferably 5 minutes or more. The reaction may be carried out at atmospheric pressure. It is important that the polymerization reaction of the reaction system comprising the monomer, the oxidation-polymerization agent and the solvent is followed by the addition of water before separating of the resulting product from the reaction system. However, the presence of water in the reaction system in the initial stage of reaction should be avoided because it lowers the solubility of the resulting poly(alkyl-substituted pyrrole) in the solvent. The addition of water to the ion-doped poly(alkyl-substituted pyrrole) after separation from the reaction system does not improve the solubility of the polymer in an organic solvent.

The water for use in the present invention may be pure water, tap water or well water. In general, the characteristics of the electrically conductive polymer are affected by ions present in the reaction system. Therefore, pure water is preferred. The preferred molar ratio of the amount of water to the amount of the monomer is usually within the range of from 200/1 to 1,000/1, preferably 300/1 to 800/1. If the addition amount of water is too small, the amount of insoluble components tends to increase. On the other hand, if the addition amount of water is too large, the electric conductivity of the polymer tends to decrease.

Preferably, water is added to the reaction system immediately after polymerization is completed. It is unnecessary to strictly control the temperature of the reaction system during the water treatment (water addition) step. The water treatment can be conducted at the same temperature range as that specified for the polymerization, and it is usually carried out at room temperature (usually from 20° to 25° C.).

Since the polymerization product is preferably not contacted with air, the water is generally added over for a short period of time as opposed to dropwise addition. The reaction system is stirred during and after the addition of water. Completion of the water treatment can be determined by dissolving the polymer in the organic solvent of the reaction system which is used for the polymerization. When the thus treated polymer is not soluble in the organic solvent of the reaction system, completion of the water treatment can be determined experimentally, that is, by testing the solubility of the polymer treated with water in an organic solvent such as THF, benzene, toluene and chloroform. The water treatment is usually carried out at least 2 minutes, and preferably at least 5 minutes.

The polymer thus obtained is then recovered from the reaction system. When the polymerization is conducted in an organic solvent in which the water treated polymer is not soluble, the polymer can be recovered by filtration. On the other hand, when the water treated polymer is soluble in the organic solvent of the reaction system, the polymer can be recovered by adding another organic solvent in which the water treated polymer is insoluble to precipitate the same, and then filtering. The polymer thus obtained is then washed. For washing, water, methanol, etc. are used. Preferably, the polymer is washed with water and then with methanol. The product thus obtained is then dried.

The polymer thus obtained is organic solvent soluble and has a high electrical conductivity. The polymer of the present invention can be used for preparing an electrically conductive products as described above or electroconductive coating agents. The polymer may be used singly or as a mixture with other materials, for examples, other electrically conductive polymers, electrically nonconductive polymers, powder and/or fiber of metals such as gold silver and iron, carbon materials such as graphite powder and carbon fiber.

The present invention will be further described in the following Examples. However, the present invention should not be construed as being limited thereto.

EXAMPLE 1

Synthesis of 3-dodecylpyrrole 500 ml of anhydrous toluene was charged into a three-necked flask equipped with a Dimroth condenser and a dropping funnel maintained at a temperature of 20° C. in a stream of nitrogen. 100 g (0.350 mol) of a 70 wt. % toluene solution of sodium bis(2-methoxyethoxy)aluminum hydride was then gradually added to the flask with stirring. At the same temperature, a solution of 33.2 g (82.2 mmol) of 3-dodecanoyl-1-toluenesulfonylpyrrole dissolved in 150 ml of toluene was added dropwise to the mixture over a period of 1 hour. After stirring for 1 hour, the mixture was heated to a temperature of 110° C. The mixture was then stirred for an additional 4 hours at 110° C. to carry out the reaction. After completion of the reaction, the reaction solution was allowed to cool to room temperature (about 23° C.). Ion-exchanged water was then gradually added to the reaction solution with stirring. The reaction solution was further stirred until the generation of hydrogen had concluded, and the reaction solution was then allowed to stand for 60 minutes.

The reaction mixture was then divided into an organic phase and an aqueous phase containing solid matter. The organic phase thus separated was washed with saturated brine, and then dried using anhydrous sodium sulfate. The aqueous phase containing solid matter was filtered with suction, and the solid was then washed with toluene. The filtrate was then extracted with toluene. The resulting organic phase was washed with saturated brine, and then dried using anhydrous sodium sulfate. The two organic phases thus dried were then concentrated to obtain 21.5 g of a brown viscous liquid as a crude product. The crude product was then purified using a molecular still to obtain 17.0 g (yield: 88%) of 3-dodecylpyrrole.

The structure of the compound thus purified was confirmed by IR, $^1$H-NMR and $^{13}$C-NMR.
(1) IR (cm$^{-1}$): 3,408, 3,097, 2,962, 2,932, 2,859, 1,065
(2) $^1$H-NMR (δ: CDCl$_3$) 0.87 (3H, t) J=5 Hz, 1.2–2.0 (20H, m), 2.46 (2H, t) J=7 Hz, 6.0–6.2 (1H, m), 6.4–6.8 (2H, m)
(3) $^{13}$C-NMR (δ: CDCl$_3$): 124.6, 117.5, 114.7, 108.5, 31.9, 31.3, 29.7, 29.6, 29.4, 27.0, 22.7, 14.1

Preparation of Ion-doped Poly(alkyl-substituted Pyrrole)

30 mmol of ferric nitrate nonahydrate was dissolved in 130 ml of a methanol (a guaranteed class: purity>99.8% measured by chromatography) in a 500-ml flask equipped with an agitator. The flask was then placed in a constant 0° C. temperature bath while being purged with nitrogen to prepare a ferric nitrate solution. On the other hand, 15 mmol of 3-dodecylpyrrole obtained as described above was dissolved in 20 ml of the garanteed class methanol in an Erlenmeyer flask. The flask was then placed in a constant 0° C. temperature bath in the same manner as above to prepare a monomer solution.

After the temperature of each of the two solutions reached 0° C. the monomer solution was added to the ferric nitrate solution. The reaction mixture was then allowed to undergo reaction with stirring in a stream of nitrogen for 3 hours. Thereafter, 200 ml (about 11 mols) of ion-exchanged water at room temperature (about 23° C.) was poured into the flask containing the reaction solution. The reaction solution was then stirred in a stream of nitrogen for 5 minutes. The resulting black polymer in the reaction solution was separated by filtration, and then washed with 2 l of ion-exchanged water and then with 1 to 2 l of methanol. The black polymer thus washed was then dried at a temperature of 30° C. under reduced pressure to obtain 3.2 g of a black polymer powder.

About 70 mg of the black polymer powder was then molded using a pressure tablet producing machine for infrared spectrometry at a pressure of about 5,000 kg/cm$^2$ to prepare a tablet having a diameter of about 13 mm. The electrical conductivity of the specimen measured using a four-terminal method was 0.2 S/cm.

2 g of the black polymer powder was added to 38 g of tetrahydrofuran (THF: solubility parameter: 9.5). The mixture was then stirred at room temperature (about 23° C.) for 1 hour to make a solution. The solution was then filtered through a filter paper (5A). As a result, substantially no solid matter was found on the filter paper, thus showing that the product had good solubility in THF. The results are set forth in Table 3.

The filtrate had a polymer concentration of 5.1%. The difference in polymer concentration between the filtrate and the solution prior to filtering is possibly attributable to the evaporation of THF during filtration.

Solvent Solubility of the Polymer

The solubility of the black polymer powder obtained in the same manner as described above was further evaluated in diethyl ether, toluene, benzene, methyl ethyl ketone (MEK), chloroform, acetone, 1,4-dioxane, acetonitrile (AcN), dimethylformamide (DMF), and water as described above. The results are set forth in Table 1.

TABLE 1

| Solvent | Solubility parameter | Solubility |
| --- | --- | --- |
| Diethyl ether | 7.4 | ○ |
| Toluene | 8.9 | ○ |
| Benzene | 9.2 | Δ |
| Chloroform | 9.3 | ○ |
| Methyl ethyl ketone | 9.3 | x |
| Tetrahydrofuran | 9.5 | ○ |
| Acetone | 9.9 | x |
| 1,4-Dioxane | 10.0 | x |
| Acetonitrile | 11.9 | x |
| Dimethylformamide | 12.1 | x |
| Water | 23.4 | x |

Solubility: ○: at least 90% of polymer dissolved
Δ: 50% or more and less than 90% of polymer dissolved
x: amount of dissolved polymer was less than 50%

Table 1 shows that the ion-doped poly(alkyl-substituted pyrrole) of the present invention is soluble in most solvents having a solubility parameter of 7 to 9.5.

COMPARATIVE EXAMPLE 1

Polymerization, washing and drying were effected in the same manner as in Example 1, except that ion-exchanged water was not poured into the flask before separating of the product from the reaction system. Thus, a black polymer powder was obtained.

A pellet obtained by pressure-molding the black polymer powder as described in Example 1 had an electrical conductivity of 0.3 S/cm. 2 g of the black polymer powder was added to 38 g of THF. The mixture was then stirred for 2 hours at room temperature (about 23° C.). However, only a small amount of the polymer dissolved therein, leaving most (80% or more) of the polymer undissolved as a solid matter.

The black polymer powder thus obtained was then examined for solubility in various solvents in the same manner as in Example 1. As a result, it was found that the polymer was only slightly soluble in these solvents (corresponding to the symbol x in the foregoing evaluation of solubility) as in the case of THF.

EXAMPLE 2

Black polymer powders were obtained in the same manner as in Example 1, except that the amount of ion-exchanged water poured into the flask was 50 ml, 100 ml, 150 ml, 200 ml, 500 ml and 1,000 ml, respectively. Each of the black polymer powders thus obtained was then evaluated for yield, electric conductivity and solubility in THF. The results are set forth in Table 2. For comparison, the results of Comparative Example 1 are also set forth in Table 2.

TABLE 2

| | Comparative Example 1 | Example 2 | | | | | |
| --- | --- | --- | --- | --- | --- | --- | --- |
| Amount of ion-exchanged water(ml) | 0 | 50 | 100 | 150 | 200 | 500 | 1,000 |
| Amount of water to monomer (molar ratio) | 0 | 185 | 370 | 556 | 741 | 1,852 | 3,704 |
| Amount of polymer (g) | 3.2 | 3.1 | 3.2 | 3.2 | 3.2 | 3.2 | 3.2 |
| Electric conductivity (S/cm) | 0.3 | 0.2 | 0.2 | 0.2 | 0.2 | 0.06 | 0.03 |
| Solubility in THF | x | Δ | ○ | ○ | ○ | ○ | ○ |

Note: The evaluation criteria of solubility in THF is the same as in Table 1.

Table 2 shows that the solubility of the polymer was improved when the amount of water added to the reaction system before separation of the polymer was increased, but the polymer exhibited reduced electric conductivity when too much water was added to the reaction system.

EXAMPLE 3

In accordance with the process for preparation of an electrically conductive polypyrrole described in JP-A-63-101415, ferric hydroxide (obtained by reacting 93 mmol of ferric chloride hexahydrate and 278 mmol of sodium hydroxide in 500 ml of pure water for 2 hours) was reacted with benzenesulfonic monohydrate at a temperature of 50° C. in 250 ml of methanol for 4 hours to obtain 60 mmol of ferric benzenesulfonate trihydrate.

Polymerization was effected in the same manner as in Example 1, except that 10 mmol of 3-dodecylpyrrole was used as a monomer, 20 mmol of the foregoing ferric benzenesulfonate instead of ferric nitrate was used as an oxidation polymerization agent, 100 ml of methanol (garanteed class used in Example 1) was used as a solvent, and 130 ml of ion-exchanged water was added to the polymerization reaction system. The resulting polymer was recovered by filtration, washed, and then dried in the same manner as Example 1 to obtain 2.6 g of a black polymer powder. The molar ratio of the water to the monomer was 722. The molar ratio of the ferric benzenesulfonate oxidation polymerization agent to the monomer was 2.0.

The electric conductivity of the black polymer powder was 0.04 S/cm. 2 g of black polymer powder was substantially completely dissolved in 38 g of THF at a concentration of 5%. The results are set forth in Table 3.

COMPARATIVE EXAMPLE 2

Polymerization was effected in the same manner as in Example 3, except that ion-exchanged water was not added to the polymerization reaction system. Thus, 2.5 g of a black polymer powder was obtained. The black polymer powder thus obtained had an electric conductivity of 0.1 S/cm but was only sparingly soluble in THF. The results are set forth in Table 3.

TABLE 3

|  | Example 1 | Example 2 | Example 3 | Comparative Example 2 |
|---|---|---|---|---|
| Monomer | 3-Dodecyl-pyrrole | 3-Dodecyl-pyrrole | 3-Dodecyl-pyrrole | 3-Dodecyl-pyrrole |
| Polymerization oxidation agent | Ferric nitrate nonahydrate | Ferric nitrate nonahydrate | Ferric benzene-sulfonate | Ferric benzene-sulfonate |
| Molar ratio of oxidation polymerization agent/monomer | 2.0 | 2.0 | 2.0 | 2.0 |
| Molar ratio of added water/monomer | 741 | 185 | 722 | 0 |
| Amount of polymer (g) | 3.2 | 3.1 | 2.6 | 2.5 |
| Electric conductivity (S/cm) | 0.2 | 0.2 | 0.04 | 0.1 |
| Solubility in THF | ○ | △ | ○ | x |

Note: The evaluation criteria of solubility in THF was the same as in Table 1.

COMPARATIVE EXAMPLE 3

Black polymer powders were obtained in the same manner as in Example 1, except that the monomer was dissolved in three mixtures of methanol and ion-exchanged water in different proportions, and ion-exchanged water alone, as solvents for the reaction system. Furthermore, ion-exchanged water was not added before separating the product from the reaction system. The black polymer powders thus obtained were then evaluated for yield, electric conductivity and solubility in THF. The monomer did not dissolved in the system comprising water alone as a solvent, and thus provided little or no polymer. The systems comprising a mixture of methanol and water as a solvent for dissolving the monomer therein provided black polymer powders having no solubility in THF. The results are set forth in Table 4.

TABLE 4

| Amount of methanol (ml) | 145 | 140 | 135 | 0 |
|---|---|---|---|---|
| Amount of ion-exchanged water (ml) | 5 | 10 | 15 | 150 |
| Monomer | 3-Dodecyl-pyrrole | 3-Dodecyl-pyrrole | 3-Dodecyl-pyrrole | 3-Dodecyl-pyrrole |
| Oxidation polymerization agent | Ferric nitrate nonahydrate | Ferric nitrate nonahydrate | Ferric nitrate nonahydrate | Ferric nitrate nonahydrate |
| Molar ratio of oxidization-polymerization agent/monomer | 2.0 | 2.0 | 2.0 | 2.0 |
| Molar ratio of added water/monomer | 0 | 0 | 0 | 0 |
| Amount of polymer (g) | 2.9 | 3.3 | 3.1 | about 0 |
| Electric conductivity (S/cm) | 0.2 | 0.1 | 0.025 | — |
| Solubility in THF | x | x | x | — |

Note: The evaluation criteria of solubility in THF was the same as in Table 1.

The ion-doped poly(alkyl-substituted pyrrole) obtained according to the process of the present invention is soluble in many organic solvents, and thus is advantageous for preparing molded products there therefrom.

While the invention has been described in detail and with reference to specific embodiments thereof, it will be apparent to one skilled in the art that various changes and modifications can be made therein without departing from the spirits and scope thereof.

What is claimed is:

1. A process for the preparation of an ion-doped poly(alkyl-substituted pyrrole) having improved solubility in an organic solvent which comprises dissolving an alkyl-substituted pyrrole compound represented by formula (I) in an organic solvent, oxidation-polymerizing the dissolved alkyl-substituted pyrrole in the presence of at least one oxidation polymerization agent selected from the group consisting of a ferric salt, a copper (II) salt, and said salts having water of crystallization to form an ion-doped poly(alkyl-substituted pyrrole), and adding water to the polymerization reaction system after completion of the reaction to improve solubility of the ion-doped poly(alkyl-substituted pyrrole) in an organic solvent, said alkyl-substituted pyrrole is represented by the following formula:

wherein X represents an alkyl group; and Y represents a hydrogen atom or an alkyl group.

2. The process of claim 1, wherein said alkyl-substituted pyrrole compound is 3-alkylpyrrole.

3. The process of claim 1, wherein said alkyl-substituted pyrrole compound is 3,4-dialkylpyrrole.

4. The process of claim 1, wherein said organic solvent used for the polymerization is selected from the group consisting of alcohol, tetrahydrofuran, acetonitrile, benzene, toluene, acetone, diethyl ether and mixtures thereof.

5. The process of claim 1, wherein said organic solvent used for the polymerization is at least one member selected from the group consisting of methanol and ethanol.

6. The process of claim 1, wherein said ferric salt is selected from the group consisting of ferric chloride, ferric nitrate, ferric chlorate, aromatic ferric sulfonate, and said salts having water of crystallization.

7. The process of claim 1, wherein said copper (II) salt is selected from the group consisting of copper (II) chlorate, aromatic copper (II) sulfonate, and said salts having water of crystallization.

8. The process of claim 1, wherein said alkyl-substituted pyrrole compound is dissolved in an amount of from 0.01 to 5 mols per l of the organic solvent.

9. The process of claim 1, wherein the molar ratio of said oxidation polymerization agent to said alkyl-substituted pyrrole compound is in the range of from 0.1/1 to 5/1.

10. The process of claim 1, wherein X in formula (I) is an alkyl group having from 3 to 20 carbon atoms and Y is a hydrogen atom.

11. The process of claim 1, wherein X in formula (I) is an alkyl group having from 6 to 18 carbon atoms and Y in formula (I) is an alkyl group having from 1 to 12 carbon atoms.

12. The process of claim 1, wherein the molar ratio of added water to said alkyl-substituted pyrrole compound is in the range of from 200/1 to 1,000/1.

13. The process of claim 1, wherein said water is added until a solubility ratio wherein 2 g of said ion-doped poly(alkyl-substituted pyrrole) becomes 50% soluble in 38 g of said organic solvent at 23° C. is achieved.

14. The process of claim 13, wherein said organic solvent comprises at least one member selected from the group consisting of diethyl ether, toluene, benzene, chloroform, and tetrahydrofuran.

15. The process of claim 13, wherein said organic solvent is tetrahydrofuran.

16. The process of claim 1, wherein said reaction system does not contain a substantial amount of water before completion of the reaction.

17. The process of claim 16, wherein the water content of the reaction system is less than 1%.

18. An ion-doped poly(alkyl-substituted pyrrole) having improved solubility in an organic solvent produced by a process comprising the steps of:

(i) dissolving an alkyl-substituted pyrrole compound represented by formula (I) in an organic solvent, (ii) oxidation-polymerizing the dissolved alkyl-substituted pyrrole in the presence of at least one oxidation polymerization agent selected from the group consisting of a ferric salt, a copper (II) salt, and said salts having water of crystallization to form an ion-doped poly(alkyl-substituted pyrrole) in a polymerization reaction system; and (iii) adding water to the polymerization reaction system after completion of the reaction to improve solubility of the ion-doped poly(alkyl-substituted pyrrole) in an organic solvent, wherein said alkyl-substituted pyrrole is represented by the following formula:

wherein X represents an alkyl group; and Y represents a hydrogen atom or an alkyl group.

* * * * *

UNITED STATES PATENT AND TRADEMARK OFFICE
CERTIFICATE OF CORRECTION

PATENT NO. : 5,514,771
DATED : May 7, 1996
INVENTOR(S) : Katsumi NAKAMA

It is certified that error appears in the above-indentified patent and that said Letters Patent is hereby corrected as shown below:

On the title page, item [22],
please change the filing date of "January 17, 1996" to --January 17, 1995--.

Signed and Sealed this

Twelfth Day of November, 1996

*Attest:*

BRUCE LEHMAN

*Attesting Officer*     *Commissioner of Patents and Trademarks*